Nov. 24, 1959 P. N. WINTERS 2,914,623

STABILIZED INVERTER STAGE

Filed Aug. 15, 1955

INVENTOR
Paul N. Winters
BY R. E. Fowler
ATTORNEY

United States Patent Office 2,914,623
Patented Nov. 24, 1959

2,914,623

STABILIZED INVERTER STAGE

Paul N. Winters, Culver City, Calif., assignor to General Motors Corporation, Detroit, Mich., a corporation of Delaware Application August 15, 1955, Serial No. 528,395
7 Claims. (Cl. 179—171)

This invention relates to phase inverter means and more particularly to ultra stable phase inverter means which introduces a minimum amount of error or distortion into the system.

In computing equipment such, for example, as range finders and trackers, the ultimate in stability and accuracy is required of the electronic equipment. It has therefore been the practice to utilize in the manufacture of such equipment precision components which are not only expensive but may not be available at necessary locations for service when such is required. If stability within a desired range could be maintained and commercially available components used, a considerable practical advantage would result.

It is therefore an object in making this invention to provide a phase inverter stage utilizing commercially available parts which maintains very stable operation.

It is a further object in making this invention to provide a phase inverter stage which holds amplitude, phase shift and distortion from harmonics within very close tolerances.

With these and other objects in view which will become apparent as the specification proceeds, my invention will be best understood by reference to the following specification and claims and the illustrations in the accompanying drawings, in which:

Figures 1, 2:
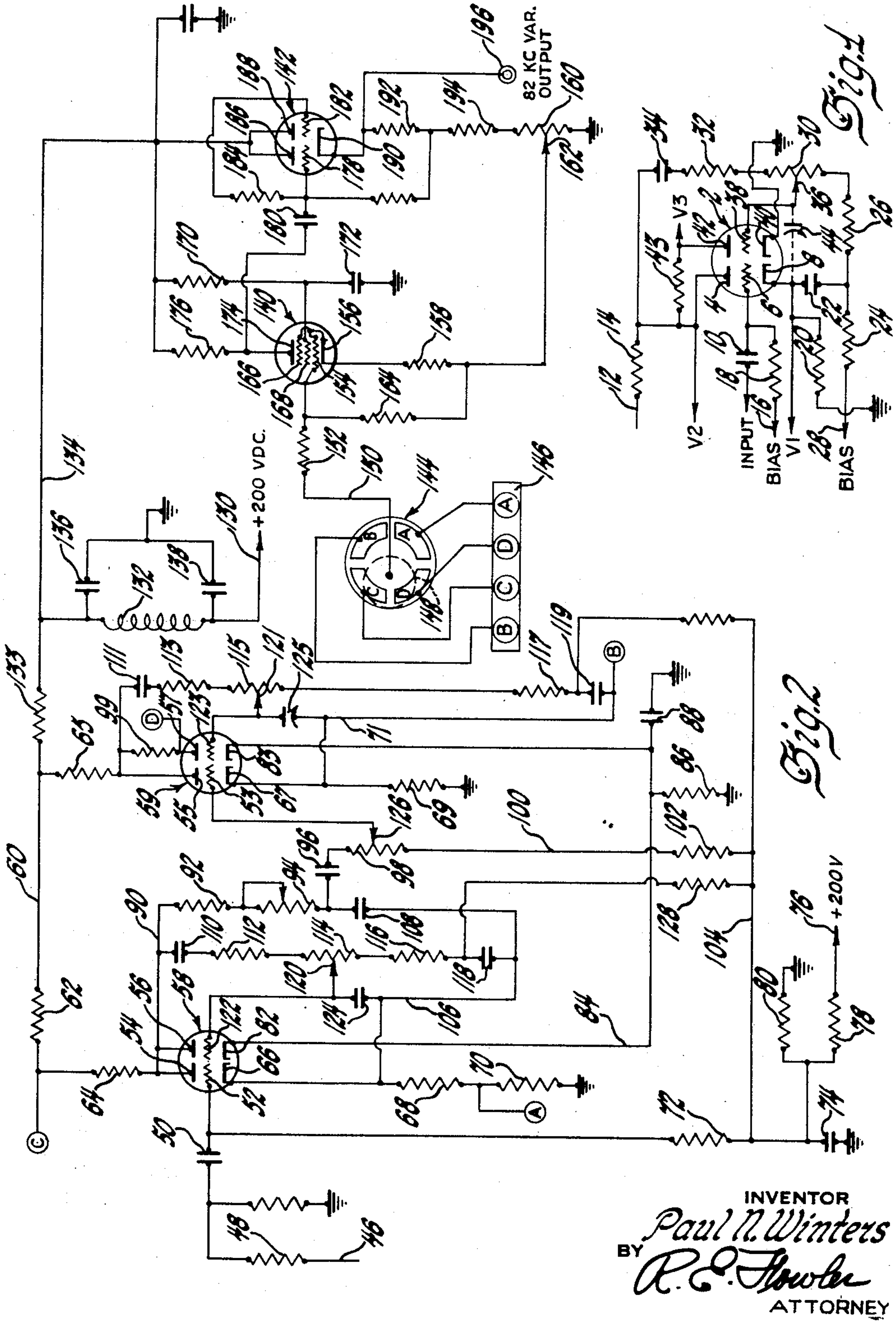
Figure 1 is a circuit diagram of an inverter stage embodying my invention.
Figure 2 is a circuit diagram of an inverter and amplifier section of a range tracking device incorporating the inverter stage of my invention to show its utility.

In a phase inverter stage errors may be introduced by phase shift, harmonic distortion or amplitude distortion. These may be introduced into the stage by the inaccuracies of any of the components utilized. The inverter stage shown in Figure 1, however, is designed to detect any errors and to compensate for them, providing in the output a satisfactory signal as compared with the input signal.

Referring now more particularly to Figure 1, there is shown therein an electron tube 2 consisting of two triode sections, the first of which is to operate as an inverter stage. This section includes a plate 4, control grid 6, and cathode 8. The signal input is applied to the control grid 6 through a coupling condenser 10. The line 12, connected to a suitable source of power, is connected through a dropping resistor 14 to the plate 4 to provide plate voltage. A source of bias potential is connected to the lead 16 and thence through a resistor 18 to a control grid 6. Cathode 8 is connected to ground through a biasing resistor 20. A condenser 22 is connected between cathode 8 and a center tap between two resistances 24 and 26. These two resistances are connected in series between a source of bias potential 28 and a third resistor 30. The opposite terminal of the resistor 30 is connected to a fourth resistor 32, completing the potentiometer section, and that in turn is connected through condenser 34 to the plate 4 of the first triode section. An adjustable tap 36 which slides over the resistor 30 is connected to the control grid 38 of the second triode section. The cathode 40 of the second triode section is grounded. The plate 42 of the second triode section is connected to the plate 4 of the first section through a resistor 43.

The first triode section, formed of cathode 8, grid 6 and plate 4, forms an ordinary inverter stage, the output of which may be taken from either V1 or V2, depending upon the desired phase relation of the signal. The first section is connected across a capacitor-resistor string or series connection which includes condenser 34, resistances 32, 30 and 26, and condenser 22, all connected in that series relationship. Any dissimilarity between the applied signals and those at V1 or V2 will appear as an unbalanced voltage at the electrical center of this series string; that is, an unbalanced voltage will be developed at the tap 36 on the potentiometer 30. Such a dissimilarity in the applied signals and those of V1 and V2 may be in phase distortion, for example, or any amplitude or harmonic distortion. Such an error signal which appears at the tap would be one-half of the total error and this voltage is applied to grid 38 of the second section of the tube. This section inverts the error signal and applies it in amplified form to the plate 4 of the first section through resistance 43. This amplified and inverted error signal will be of the correct proportion and phase to reduce or compensate for any error in the inverter and make the signals, i.e., that on the input line as compared with either that on the line V2 or that on the line V1, more identical. With this type of circuit the output may be taken from V3 rather than at the point labeled V2.

Once this stable inverter stage has been adjusted and set, any unbalance caused by phase shift, amplitude or harmonic distortion or any other source will therefore cause a compensating signal to be applied to the grid 38 to correct therefore and maintain the inverter stage within required stability limits. When the inverter is to be used at frequencies above fifty kilocycles, it is necessary to add condenser 44, which is connected between cathode 8 and grid 38, to compensate for a slight phase shift across resistors 32, 30 and 26 at higher frequencies. This is shown in dotted line connection as it is optional, depending upon the frequency of operation. If desired, this condenser may be made adjustable and adjusted for the different frequency bands of operation. By the use of this balanced system any component part of the inverter may be replaced using commercial grade parts. When any new part is installed, the tap 36 is adjusted to rebalance the system and compensate for any change in the value of the part substituted.

Figure 2 shows a range system incorporating stabilized inverter stages of my invention. It discloses a system which develops different signals all spaced at 90° to each other from a single signal input. These output signals may then be used selectively to obtain the desired timed relation or combined and amplified and applied to the output. The first two tubes 58 and 59 are inverter stages. Points labeled A, B, C and D indicate points from which different output signals may be taken off that are displaced 90° from each other, A and B are connected to the cathode circuits of the tubes and C and D from the plate circuits. These points may be connected to a terminal board 146 and then selected through a capacity switching arrangement 144, amplified by tubes 140 and 142 and applied to the output terminal 196.

The input to the general system is connected to line 46 where it is applied through series resistor 48 and coupling condenser 50 to the control grid 52 of the first inverter amplifier stage. The two plates 54 and 56 of double triode tube 58 are connected together and are supplied with power from the main D.C. power line 60 through two resistors 62 and 64. The cathode 66 of the first amplifier section is connected to ground through two resistances 68 and 70 in series. A biasing resistor 72 is connected to the control grid 52 of the first triode section. A condenser 74 is connected between the biasing resistor 72 and ground. A source of power 76 is connected through dropping resistor 78 to a point between biasing resistor 72 and by-pass condenser 74. A further resistor 80 is connected between that point and ground. This provides an operating bias for various parts of the amplifier.

The cathode 82 of the second triode section of the tube 58 is connected through conductor 84 directly to cathode 83 of the second stabilized phase inverter stage. This line 84 is also connected to ground through resistor 86 in parallel with a bypass condenser 88. The plates 54 and 56 of the tube 58 are connected through line 90 with one terminal of a resistor 92 which is connected in series with an adjustable resistance 94. The opposite terminal of adjustable resistance 94 is connected through a coupling condenser 96 and resistor 98 in series therewith to conductor 100 to couple into the next stage. The line 100 is connected through dropping resistor 102 to bias potential line 104. Cathode 66 of the first section of the amplifier tube 58 is connected through conductor 106 to condenser 108, the opposite terminal of which is connected to variable resistor 94. This section consisting of resistors 92 and 94 and condenser 108 provides a 90° phase shift, as will be later described.

Connected in series relation between lines 90 and 106 are condenser 110, resistances 112, 114 and 116, and condenser 118. This forms the balanced voltage string for the first inverter stage corresponding to condenser 34, resistances 32, 30 and 26, and condenser 22 of Figure 1. A variable tap 120, which slides on resistance 114, is connected directly to control grid 122 in the second triode section of the tube 58 and also through condenser 124 to the line 106. A variable tap 126 which slides over resistance 98 is connected directly to the control grid 53 of the second inverter stage and determines the signal amplitude applied thereto. A further biasing resistor 128 is connected between the bias potential line 104 and a point intermediate resistance 116 and condenser 118. This provides a D.C. bias on the grid 122. A source of D.C. power is connected at point 130 which is connected through an inductance coil 132 to power supply line 134. Condensers 136 and 138 are connected between opposite ends of the inductance 132 and ground, forming a filter system. The power supply line 134 supplies power to all of the plates of the circuit through desired dropping resistances such as 133 to provide the correct potential.

An output tap A is connected to a point intermediate the resistances 68 and 70 in the cathode string of tube 58. A similar tap C is connected in the plate circuit. The signals at taps A and C will be 180° phase displaced. In order, however, to obtain four signals all displaced by 90°, the output from the first inverter stage 58 must be turned or rotated 90° before it is applied to the second inverter. This is accomplished by the resistance-capacity coupling 92—94—108. The resistive reactance of the resistors 92 and 94 and the capacitive reactance of the condenser 108 are selected and adjusted to be approximately equal which, at the frequencies used, will provide a 90° phase shift.

The signal from the output of the first inverter stage is phase shifted and applied from tap 126 to the control grid 53 of the second inverter stage which is substantially the same as the first stage. The plate 55 of the first section of tube 59 is connected through resistance 65 and resistance 133 to power line 134. The cathode 67 is connected to ground through biasing resistor 69. It is also connected through tie line 71 to an output contact B. The control grid 123 of the second section of tube 59 is directly connected to an adjustable tap 121 or resistor 115 and through a variable condenser 125 to tie line 71. The series balancing string connected across the first section of the tube 59 consists of condenser 111, resistances 113, 115 and 117 and condenser 119 in that order from the plate to the cathode side. The plate 57 of the second section of the tube 59 is connected to the first plate 55 through resistor 99, similar to resistor 43 of Fig. 1. The adjustable tap 121 that slides over resistor 115 for balancing purposes is connected directly to the control grid 123 of the second section. A variable condenser 125 is connected between the adjustable tap 121 and line 71. From this section there are also provided two output connections for signals. They are D connected to plate 57 of tube 59, and B connected to the cathode of that tube 59 which provides 180° displaced signals. Thus at the four points A, B, C, and D, signals which are phase displaced by 90° electrical degrees may be obtained from the two inverter stages stabilized against unbalance.

So far the description has detailed the construction of the inverter stages. The output of the inverter stages is applied to two further amplifier stages which include tubes 140 and 142. A selective or combining coupling means, generally identified at 144, provides coupling of these two amplifier stages to the previous system. In order to save confusion as to connections, the actual connections between certain parts of the system and the selective coupling means have been eliminated, but small circles identified as A, B, C, D, as shown, indicate those points as being connected to similarly labeled points on the connection board 146 of the coupling means. Each one of the contacts A, B, C, and D is connected to a conductive segment similarly labeled within the switch mechanism. A movable conductive disc 148 shown as a dotted circle may be moved over these segments to produce an electrical condenser therewith and transfer electrical signal energy by the capacity coupling so provided. This disc 148 is connected through line 150 and resistor 152 to the control grid 154 of the first amplifier stage 140.

The cathode 156 of this tube is connected to ground through dropping resistor 158 and a portion of the resistance 160 as determined by the adjustable tap 162 thereon. Resistor 164 is connected between the adjustable tap 162 and the control grid 158 to determine grid bias. The suppressor grid 166 of the tube 140 is connected to the cathode 156 internally of the tube. The screen grid 168 of this tube is connected to a point intermediate dropping resistor 170 which is fed by the main power line 134 and a condenser 172, the opposite terminal of which is grounded. The plate 174 of the tube 140 is supplied with power through a resistor 176 connected to the main power line, and is also coupled to control grid 178 of the second amplifying tube 142 through a coupling condenser 180. A second control grid 182 of the double triode tube 142 is connected to the first grid through a resistor 184. The plates 186 and 188 of the tube 142 are commonly connected together to the supply line 134. The cathode 190 of the tube 142 is connected to ground through three series resistors 192, 194 and 160, and the output from the amplifier section indicated at 196 is taken off from the cathode 190 and provides the desired amplified properly phased, and stable signal. By adjusting the position of the disc 148 of the coupling means any one of the four 90° displaced signals may be applied to the amplifier and then to the output.

I have thus provided for use in precision equipment a stabilized inverter amplifier stage utilizing commercial components, which provides signals within tolerance limits.

I claim:

1. In amplifying means, an electron tube having a plate, control grid and cathode, means for applying a signal to the grid, output means connected to the plate, a plurality of reactive and resistive impedance means connected in opposed complementary series circuit with the resistive impedance means located centrally in said series circuit, said series circuit being connected across the plate and cathode, a source of electrical power connected to said resistive impedance means, adjustable means on said centrally located resistive impedance means in said series circuit to electrically balance the proportional parts of the impedance to null for a given signal and phase inverting means connected to the adjustable means and to the plate for feeding back a corrective signal in the proper polarity and degree to the plate in inverse phase to maintain the output undistorted in the event of any shift in the output signal.

2. In amplifying means, an electron tube having a cathode, grid and plate, an input circuit connected to said grid and cathode, an output circuit connected to said plate, a plurality of capacitative and resistive impedances connected in series between the plate and cathode with said capacitative impedances at opposite ends of the series and the resistive impedances between them, a tap movable over the centrally located resistive impedance to locate a balance point and phase inverting means connected between the tap and plate to provide a signal in inverse phase of correction.

3. In amplifying means, an input circuit, a phase inverter stage connected to said input circuit and having an output circuit, a plurality of terminals connected to said output circuit to provide two signals 180° displaced, a phase shifting network connected to the output circuit of the inverter stage to shift the signal ninety electrical degrees, a second phase inverter stage having an input and an output circuit, said input circuit being connected to the network and a plurality of terminals connected to said second inverter stage output circuit providing two signals displaced 180° from each other and 90° from the first two signals.

4. In amplifying means an input circuit, a first phase inverter stage connected to said input circuit and having an output circuit, a plurality of terminals connected to said output circuit to provide two signals 180° displaced, a phase shifting network connected to the output circuit of the inverter stage including resistance and capacitance means in series to shift the signal ninety electrical degrees, a second phase inverter stage connected to said network and to which the shifted signal is applied, a second plurality of terminals connected to said second phase inverter stage, selective coupling means conductively connected to the plurality of terminals for each inverter stage to provide four signals displaced by 90° and amplifying means connected to the selective coupling means to amplify the selected signal.

5. In amplifying means, an electron tube having a plate, grid and cathode, an input circuit connected to the cathode and grid, an output circuit connected to the plate, a plurality of condensers and resistances connected in opposed complementary series circuit across the plate and cathode with the condensers on the ends, an adjustable tap on one of the resistances to balance the circuit, a second tube having a grid, plate, and cathode, means connecting said second plate to said first plate, a source of electrical power connected to both plates, means connecting said second cathode to ground, said tap being connected to the second grid to apply an inverted signal to the plates if an unbalance occurs in the output circuit of the first tube to stabilize the stage.

6. In amplifying means, an electron tube having a plate, grid and cathode, an input circuit connected to the cathode and grid, an output circuit connected to the plate, a plurality of condensers and resistances connected in opposed complementary series circuit across the plate and cathode with the condensers on the ends, biasing means connected to said resistances, an adjustable tap on one of the resistances to balance the circuit, a second tube having a grid, plate, and cathode, means connecting said second plate to said first plate, a source of electrical power connected to both plates, means connecting said second cathode to ground, said tap being connected to the second grid to apply an inverted signal to the plates if an unbalance occurs in the output circuit of the first tube to stabilize the stage, and adjustable condenser means connected between the tap and first cathode to adjust for different frequencies of operation.

7. In stable distortionless amplifying means utilizing commercial components, a phase inverter section having an input and an output circuit in the latter of which it is desired to reproduce an amplified inverted signal corresponding to the input signal without distortion, a plurality of impedance elements forming opposed complementary sections connected in series across the output circuit, one of said impedance elements having a variably positionable tap, a second phase inversion means having an input and an output circuit, said second phase inversion means input circuit being connected to the tap on the impedance means and said second phase inversion means output circuit connected to said first named output circuit to supply corrective signals of proper polarity and size to produce distortionless signals of the same phase in the output as those introduced to the input of the first named phase inverter section.

References Cited in the file of this patent

UNITED STATES PATENTS

| | | |
|---|---|---|
| 2,383,846 | Crawley | Aug. 28, 1945 |
| 2,538,488 | Volkers | Jan. 16, 1951 |
| 2,743,321 | Coulter | Apr. 24, 1956 |

OTHER REFERENCES

Text—Radio Handbook, 6th edition, 1939, published by Radio Ltd., Santa Barbara, Calif., pages 318–319.